US007059541B2

(12) United States Patent
Jensen et al.

(10) Patent No.: US 7,059,541 B2
(45) Date of Patent: Jun. 13, 2006

(54) FLUID MIXING BLOCK

(75) Inventors: Dale S. Jensen, South Smithfield, UT (US); Edward E. Durrant, West Providence, UT (US); Shawn Rodeback, Smithfield, UT (US); Wayne Boone, Snohomish, WA (US); Chris Ryan, Lynnwood, WA (US); Matt Brain, Seattle, WA (US)

(73) Assignee: Harris Research, Inc., Logan, UT (US)

( * ) Notice: Subject to any disclaimer, the term of this patent is extended or adjusted under 35 U.S.C. 154(b) by 134 days.

(21) Appl. No.: 10/757,942

(22) Filed: Jan. 15, 2004

(65) Prior Publication Data

US 2005/0156059 A1 Jul. 21, 2005

(51) Int. Cl.
*A62C 5/02* (2006.01)
*B05B 7/10* (2006.01)
*B01D 35/00* (2006.01)

(52) U.S. Cl. ...................... 239/310; 239/406; 239/407; 239/413; 210/85

(58) Field of Classification Search ................ 239/406, 239/407, 310, 413, 417; 210/85
See application file for complete search history.

(56) References Cited

U.S. PATENT DOCUMENTS 3,023,968 A * 3/1962 Mitchell ..................... 239/125
3,776,468 A 12/1973 Davenport
3,949,611 A * 4/1976 Watt ........................ 73/864.35
4,113,182 A * 9/1978 Brago ........................ 239/304
4,570,856 A 2/1986 Groth et al.
5,053,202 A 10/1991 Dwyer et al.
5,119,989 A * 6/1992 Kamis ........................... 239/8
5,179,975 A 1/1993 Stevenson
5,294,052 A 3/1994 Kukesh
5,507,305 A 4/1996 Franklin
5,518,033 A * 5/1996 Webster ....................... 138/90
5,611,462 A * 3/1997 Barkes ....................... 222/134
5,626,291 A 5/1997 Flinn et al.
5,779,361 A 7/1998 Sugiura
5,850,973 A 12/1998 Liljeqvist et al.
6,105,880 A 8/2000 Bazil et al.
6,179,223 B1 1/2001 Sherman et al.
6,264,119 B1 7/2001 Truong
6,321,939 B1 * 11/2001 Treat et al. .................... 222/2
6,622,942 B1 * 9/2003 Ueno et al. ................. 239/311
6,705,539 B1 * 3/2004 Bien ........................... 239/10
6,749,027 B1 * 6/2004 Crabtree et al. .............. 169/44

* cited by examiner

*Primary Examiner*—David A. Scherbel
*Assistant Examiner*—Seth Barney
(74) *Attorney, Agent, or Firm*—Starkweather & Associates; Michael W. Starkweather; Jason P. Webb

(57) ABSTRACT

A fluid mixing arrangement, referred to as a mixing block, for use in mixing two liquids like an acidic and a basic components of a cleaning solution, which is placed under pressure and sprayed through a conventional spray gun or nozzle at a reduced amount of pressure. In particular, the innovative design of the present invention provides the unique features of allowing manual and visual inspection of the various chambers, inlets, flow-rate or pressure reducing orifices, supply filters, and backflow preventing valves of the mixing block.

13 Claims, 4 Drawing Sheets

FLUID MIXING BLOCK

BACKGROUND OF THE INVENTION

1. Field of the Invention

The present invention relates generally to a mixing arrangement, referred to as a mixing block, for use in mixing multiple liquids, like an acidic and a basic component of a cleaning solution, which is placed under pressure and sprayed through a conventional spray gun or nozzle at a lower pressure. In particular, the innovative design of the present invention provides the unique features of allowing manual and visual inspection of the various chambers, inlets, flow-rate reducing orifices, supply filters, and backflow preventing valves of the mixing block.

2. State of the Art

There is a need in the art to provide a mixing block that filters fluids entering the mixing block, that reduces the rate of flow of mixed solution exiting the mixing block, that prevents the backflow of liquids into supply hoses, that provides for ample mixing space, and that allows for mixing chamber access to facilitate periodic manual inspection, cleaning and/or flow regulation. Typical mixing arrangements involve a mixing chamber with two inlets on opposite sides of a central chamber which mix when injected into the chamber and which pool in a reservoir until the mixed solution flows out of a single outlet connected to a spray gun, or other dispensing tool, by a hose or pipe.

A common problem for these typical mixing arrangements, however, is that particulate matter or other large contaminants rapidly clog the spray gun or mixing chamber channels resulting in frequent delays in use due to laborious and wasteful line flushing. Typical mixing blocks do not provide easily accessible mixing chambers for periodic inspection and manual cleaning if necessary. Many embodiments rely on pressurized flushing of the mixing chambers rather than providing first for filtration and visual inspection of obstructions. Finally, certain liquid dispensing applications require a reduction of mixed solution flow rates, this is especially true where a liquid is stored under pressure and needs to be pumped or placed into a less pressurized environment. Additionally, almost every application requires the prevention of mixed solution flowing back upstream into an individual supply hose or supply pipe.

The following patents teach several approaches attempting to solve similar problems, which are provided not as admitted prior art, but as providing reference for what is considered to be state of the art, and are herein incorporated by reference for their relevant and supporting teachings:

U.S. Pat. No. 6,105,880 issued to Bazil et al., describes a mixing block for mixing fluid components of a multi-component system and which includes at least two component inlets, wherein each component inlet receives a respective component(s) of the multi-component system; and a solvent inlet, wherein the solvent inlet receives solvent for use in cleaning the mixing block.

U.S. Pat. No. 6,179,223 issued to Sherman et al., describes a spray nozzle fluid regulator and restrictor combination for controlling fluid supplied to a spray nozzle used in a fluid supply system including a pressure regulator portion and a fluid restrictor portion.

U.S. Pat. No. 5,850,973 issued to Liljeqvist et al., describes double barrel sprayer for applying a diluted product such as a diluted cleaning solution to a surface for cleaning thereof and rinsing the diluted product from the surface by spraying a water-only rinse onto the surface.

U.S. Pat. No. 5,779,361 issued to Sugiura, describes a new static mixer with a low pressure loss and a high agitating/mixing efficiency. The mixer comprises a mixing body having a larger diameter than the fluid passage, a mixing body cylinder portion, an inlet hollow portion, and an outlet hollow portion.

U.S. Pat. No. 5,626,291 issued to Flinn et al., describes a cleaning solution spraying system for cleaning roofs and other outside areas on or about a house that includes in combination: a venturi unit, a nozzle unit, a coupling hose, a tubular arrangement, a conduit, a check valve, a shut-off valve, and a check valve.

U.S. Pat. No. 5,294,052 issued to Kukesh, describes a novel fluid dispensing system with air motor driven pumps which provide a substantially constant pre-selected dispensation of fluids without deleterious transient variations in the fluid output as the dispensing system is operated on and off.

U.S. Pat. No. 4,570,856 issued to Gorth et al., describes a fluid circuit for a cleaning device having a mixture with separate water and cleaning fluid inlets and fittings interconnecting a pressurized source of water and a pressurized source of cleaning fluid responsive to change the mixing ratio of cleaning fluid to water as to assure the degree of mixing.

U.S. Pat. No. 5,053,202 issued to Dwyer et al., describes an improved static mixer for use in a plural component dispensing apparatus having a spacer intermediate a plurality of mixing elements to enhance the mixing and blending of the plural components.

U.S. Pat. No. 3,776,468 issued to Davenport, describes a device for mixing and spraying a mixture of two liquids at a prescribed rate of flow in a prescribed proportion to one another, one liquid being under atmospheric pressure with the other under variable pressure.

U.S. Pat. No. 6,264,119 issued to Truong, describes a method and apparatus for generating a small, maneuverable stream of filtered fluid without benefit of pump or power.

U.S. Pat. No. 5,507,305 issued to Franklin, describes an apparatus useful for providing a plurality of chemical compositions useful to clean an item, e.g. a tank comprises a plurality of reservoirs each containing a concentrated form of a different chemical composition and each having an outlet through which the concentrate exits the reservoir.

U.S. Pat. No. 5,179,975 issued to Stevenson, describes a dynamic non-recycling pumping system for combining at least one chemical agent with a liquid carrier to produce a mixture for spraying on a target. The pump has an adjustable pressurized output line and an adjustable vacuum containing a primary suction input line.

It is believed that none of the prior art patents teach, alone or in combination, the presently illustrated embodiments of the current invention. Although, many prior art inventions have attempted to solve one or more of the aforementioned problems, the present invention jointly addresses many of these concerns in a simple cost effective way.

SUMMARY OF THE INVENTION

The present invention provides for a fluid mixing arrangement, referred to as a mixing block, for use in mixing two liquids like an acidic and a basic components of a cleaning solution, which is placed under pressure and sprayed through a conventional spray gun or nozzle at a reduced amount of pressure. In particular, the innovative design of the present invention provides the unique features of allowing manual and visual inspection of the various chambers, inlets, flow-rate or pressure reducing orifices, supply filters, and backflow preventing valves of the mixing block.

In one embodiment of the present invention, there is a fluid mixing block for mixing fluid components of a reactive solution, comprising a mixing block housing. There is also at least two inlet ports and respective at least two inlet chambers formed within the mixing block housing, wherein the two inlet port and inlet chamber accepts an injection of a fluid at a first pressure from a supply source. Additionally, there is a mixing chamber, formed within the mixing block housing, wherein fluids injected from the inlet chambers are combined and mix to form a solution of desired reactivity at a lower pressure than the first pressure. There is also a dispensing port, formed within the mixing block housing, wherein the desired solution exits the mixing block housing.

Another embodiment of the invention includes a fluid mixing block further comprising at least three individual chamber plugs, which are removably fastened to the mixing block housing to allow for manual visual inspection, cleaning, and adjustments of the inlet and mixing chambers. Additionally, there is a supply filter is mechanically fastened to an inlet chamber plug for filtering out suspended particles within a fluid flowing therethrough to prevent clogging of downstream chambers or other parts.

Still a further embodiment of the invention is to provide a fluid mixing block of further comprising a backflow preventing valve/flow rate reducing orifice unit attached to the mixing block housing between each inlet chamber and the mixing chamber to reduce a rate of flow of fluid flowing therethrough and to prevent fluid from flowing back upstream into a fluid supply source.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DESCRIPTION OF THE PREFERRED EMBODIMENT

The present invention relates generally to a mixing arrangement, referred to as a mixing block, for use in mixing multiple liquids, like an acidic and a basic components of a cleaning solution, which is placed under pressure and sprayed through a conventional spray gun or nozzle that are at a lower pressure. Various fluid dispensing applications, such as materials cleaning, require a mixing of two or more fluids (typically reactive chemical compounds) in order to create a mixed solution with a desired reactivity immediately prior to dispensing. These per-use mixing techniques help to ensure optimal performance of the desired output compound(s). Some examples of applications requiring chemical mixing include, but are not limited to: clear-coat paint systems, glue hardening systems, and carpet cleaning systems. The mixing arrangements for such applications vary widely in complexity and design.

In particular, the innovative design of the present invention provides the unique features of allowing manual and visual inspection of the various chambers, inlets, flow rate reducing orifices, supply filters, and backflow preventing valves of the mixing block. This is achieved by providing removable plugs within each chamber and port. Thus, by integrating these various plugs, access to the various chambers, inlets, and other orifices is achieved without having to remove supply and/or dispensing lines. The present arrangement facilitates quick and easy cleaning of filters, chambers, valves, and/or orifices as is determined to be needed upon inspection. Furthermore, the use of removable plugs allows for quick and easy regulation or replacement of the interchangeable flow rate reducing orifice, which allows the user to achieve an optimal or desired mixture of component liquids.

FIGS. 1, 2, 3 and 4 illustrates various views of a mixing block system in accordance with the present invention and should jointly be referred to throughout the following descriptions since each view illustrates different components and views of the illustrated embodiments. The mixing block system 10 shows a view of the mixing block housing 12 with a supply line 11 and dispensing line 13. The mixing block housing 12 may be constructed of any suitable material, like resin, metals, or composites.

Figure 1:
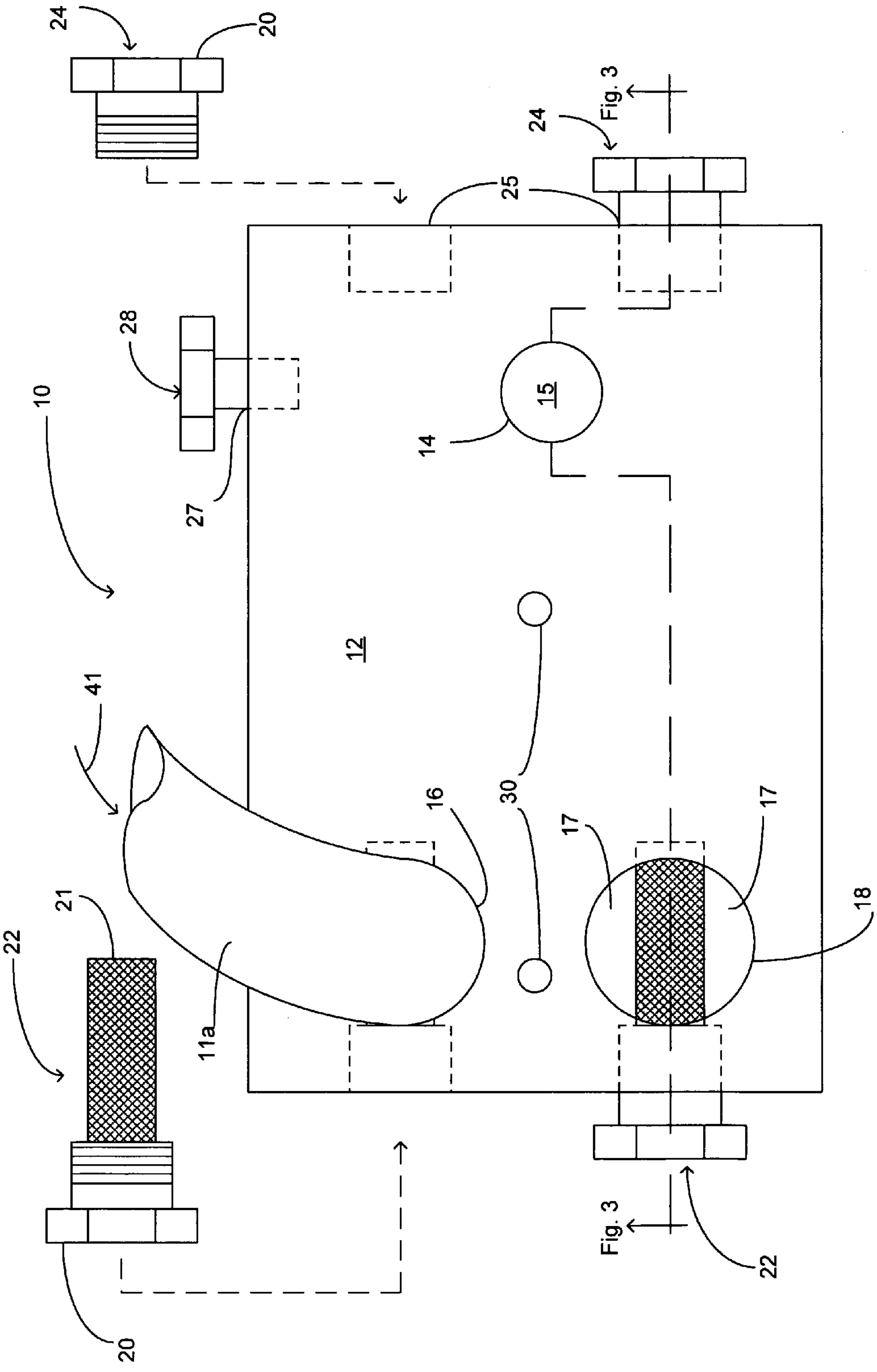
FIG. 1 illustrates the top view of a mixing block in accordance with the present invention.
Figure 2:
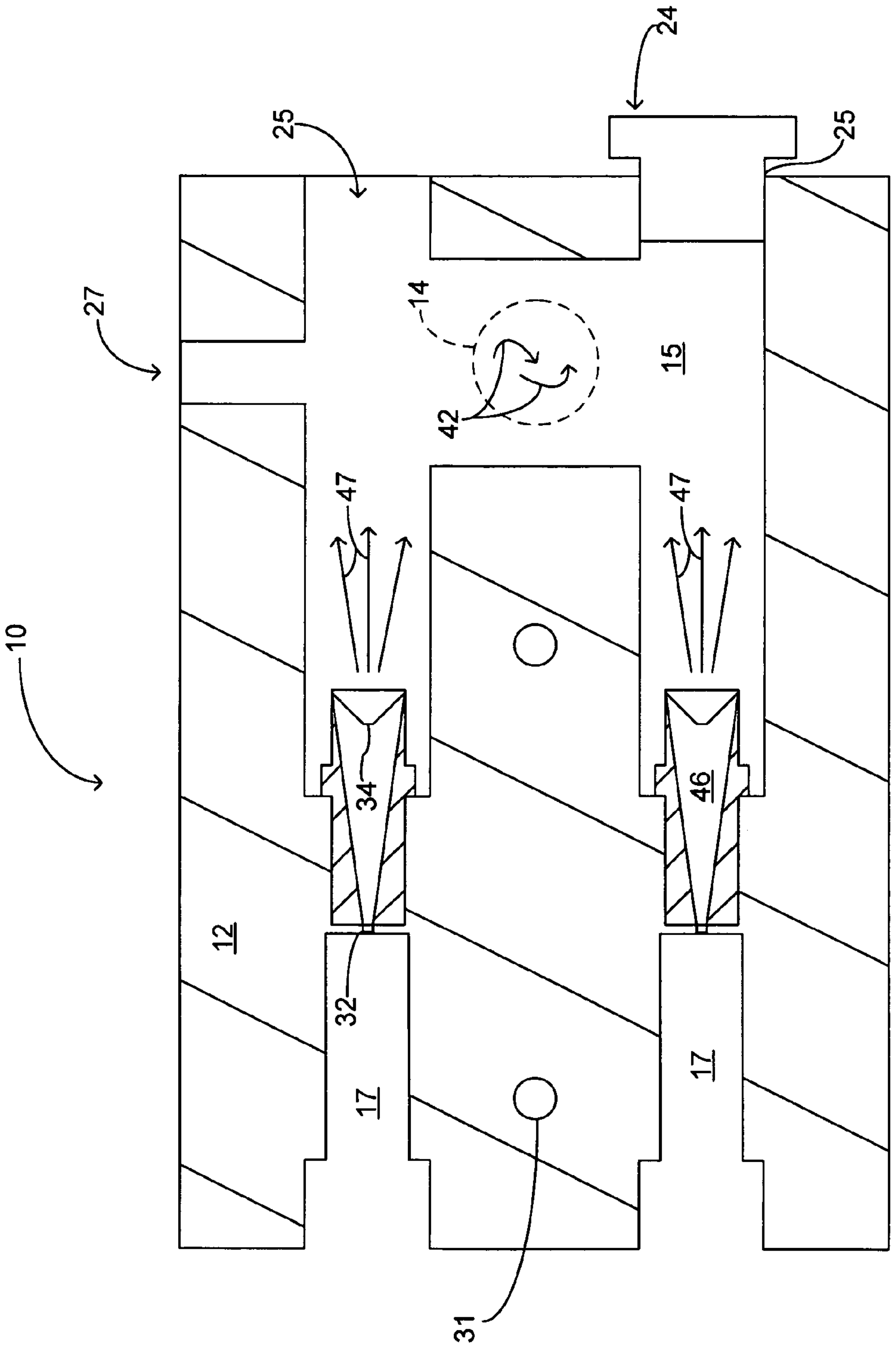
FIG. 2 illustrates a cross-sectional top view of a mixing block in accordance with the present invention illustrated in FIG. 1.
Figure 3:
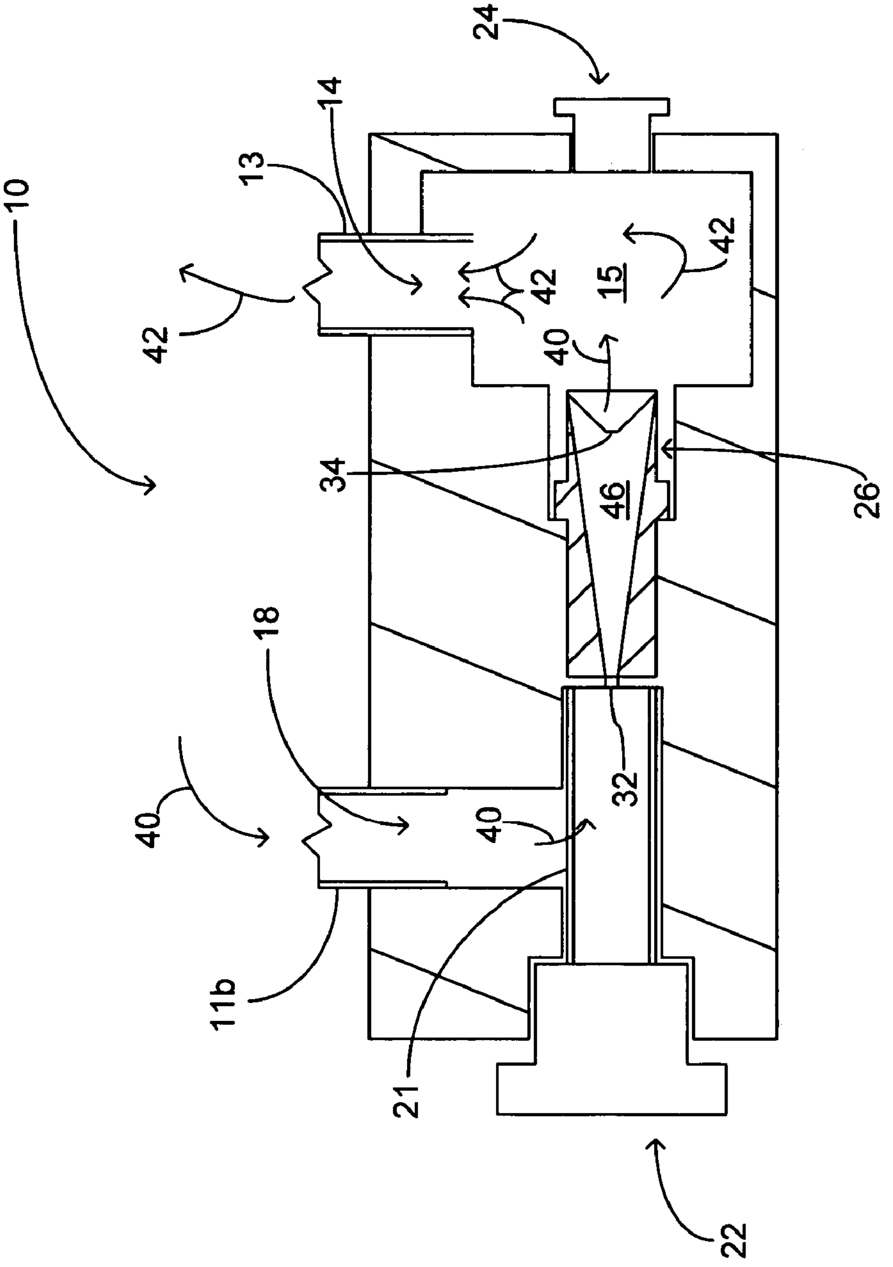
FIG. 3 illustrates a cross-sectional side view of the mixing block of FIGS. 1 and 2, in accordance with the present invention.

There is illustrated a dispensing port 14 and 58, designed to have the dispensing line 13 removably coupled thereto, via threading or other means. There are inlet ports 16, 18, 50 and 52 designed to be removably couple to the inlet lines 11*a* and 11*b* (11*a* is shown only in FIG. 1 and 11*b* is shown in FIG. 3 for ease of illustrative purposes).

There is also illustrated an inlet chamber 17 positioned below the inlet port 18 and positioned around a supply filter 21. The supply filter 21 is part of and removably coupled to a removable inlet chamber plug 22, which has a plug head 20 that extends beyond a surface of the housing 12. The filter 21 may be any suitable material as required to filter harmful particulates out of the fluid, like a wire mesh, sponge material, etc. The plug 22 may be threadably coupled to the housing 12 or attached via any other standard means. The filter 21 may be removably coupled to the plug head 20, via threading or other suitable means. A flow rate reduction orifice 32 is positioned at one end of the inlet chamber 17, and is threadably coupled into its illustrated position. Different diameter orifices 32 may be placed therein to adjust the amount of pressure created in the inlet chamber 17. The orifice 32 may be of most any known design that merely allows for adjustment of the opening between the two chambers 17 and 15 to create a pressure differential therebetween.

There is yet illustrated a removable backflow prevention device, or flow control device 26 having a backflow prevention valve 34 that prevents any backflow of the mixed solution 42 from going back into the supply lines 11*a* and 11*b*. The backflow device 26 includes a pressure chamber 46 that aids in regulating fluid pressure and allows only for the expelling of the unmixed fluid 40 into the mixing chamber 15. The backflow device 26 has a backflow valve 34 that lets fluid through only in one direction. The backflow valve 34 may be of any known design that allows fluid to flow in only one direction.

There are illustrated mixing chamber plugs 24, 64 and 66 that are removably coupled to the housing 12 via associated access ports 25. The plugs 24, 64 and 66 are positioned opposite to and sized to allow for manual inspection, access and removal of the backflow device 26 from the mixing chamber 15. When the backflow device 26 becomes clogged or otherwise hindered, it is desirous to remove the device 26 to either be replaced or cleaned. The outlet hose 13 and outlet port 14 may be centrally positioned between the first and second backflow devices 26. The central positioning of the outlet house 13 allows for the two chemical sprays 46 to become a mixed fluid 42 before exiting via the outlet hose 13.

In addition to the access plugs 24, there is optionally included a cleaning plug 28 (illustrated only in FIG. 1) that removably couples to the housing 12 via an inlet port 27. This plug 28 is positioned and sized to allow for easy cleaning of the mixing chamber 15. The plug 28 is illustrated to be at a right angle to the access plugs 24 and may be generally at the same height thereof. Although, most any advantageous position maybe suitable for the present invention. The cleaning plug 28, in an alternative embodiment, may also serve as an additional inlet port for a liquid that may not need to be fed into the mixing chamber from a pressurized container.

In yet another embodiment of the invention, the mixing block housing 12 may have mounting bolts 30 utilized for mounting the mixing block to a surface. The mounting bolts 30 may be received by mounting shafts 31, which are shafts that may be bored through the mixing block housing 12 for receiving mounting bolts, or similar hardware.

In operation, and in one embodiment described more specifically in FIG. 3, at least two liquids 40 and 41 are separately stored under pressure and enter the mixing block 10 under pressure through at least two matching inlet ports 18 and 16 respectively. The two liquids 40, 41, for example, an acid and base, subsequently pass into the respective primary inlet chambers 17 under pressure and are then filtered past filters 21. The liquids 40, 41 are then forced through the orifices device 32 and into the backflow chamber 46 of the backflow device 26, and ejected through the backflow valves 34 at a lower pressure than was present in the primary inlet chambers 17. The unmixed fluids 40, 41 are then sprayed 47 into mixing chamber 15, thus becoming a mixed solution 42. The mixed solution 42 is then pressured through port 14 and through hose 13 to be delivered, under less pressure than what was entering the mixing block 10, to, for example, a spray nozzle for being applied to a carpet.

Figure 4:
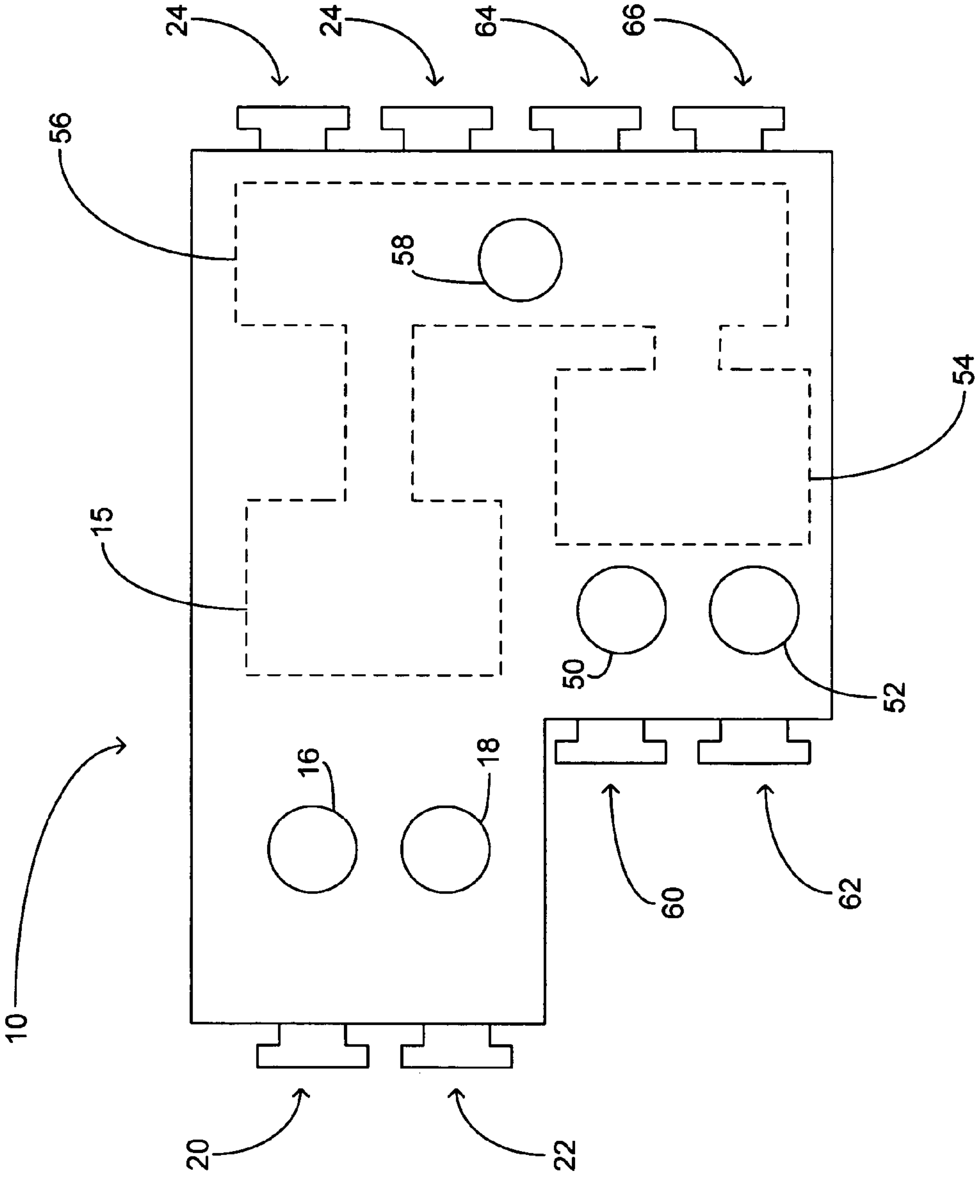
FIG. 4 illustrates a top view of another embodiment of the illustrated invention.

Referring more particularly to FIG. 4, there is an optional embodiment designed to generally illustrate multiple combinations. There are multiple input ports 16, 18, 50 and 52 more than just two input lines 11*a* and 11*b* and more than just one mixing chamber can be accommodated in the presently illustrated embodiments. Uniquely, FIG. 4 includes all of the previous features illustrated in the previous figures, although all of those features are not illustrated for simplicity sake. However, there are illustrated additional input mixing plugs 60 and 62 serving the same purpose as plugs 20 and 22. Input ports 50 and 52 are also added and would function just as ports 16 and 18. Again, though not illustrated, there are chambers 17 located below the input ports 50 and 52 serving the same function as the previously described initial chamber 17. Additionally, there are illustrated similar mixing chamber plugs 64 and 66 that serve the same function as the previously described mixing chamber plug 24.

The main new embodiment that is featured in FIG. 4 is the addition of two additional mixing chambers 54 and 56. The previously described mixing chamber 15 functions the same, excepted that the mixed liquid would now be exported to the second mixing chamber 56. Additionally, liquids entering the mixing block 10 via input ports 50 and 52 would be first mixed into mixing chamber 54 and then expelled into the second mixing chamber 56. Thereby, both mixed chemicals from the two first stage mixing chambers 15 and 54 will then be mixed together in the second stage mixing chamber 56. The entire mixture from the second mixing chamber 56 will be exported via the export port 58, just as described regarding export port 14.

The advantage of this embodiment illustrated in FIG. 4 is to illustrate that any number of mixing chambers and chemicals may be mixed in this fashion. In other words, it is contemplated to have two, three or more chemicals and/or mixing chambers used to mix the chemicals in this fashion. For example, this design allows a user to add other cleaning mixtures, like degreasers or solvents, to the starting mixture, like an acid and base, to increase the effectiveness of the applied cleaning solutions.

It is noted that a skilled artisan would understand that there are many potential applications available for the above referenced invention. For example, nearly any application, would be appropriate for use, requiring the mixing of any number of component liquids to achieve a desired reactivity or mixture. In the preferred embodiment, acidic and basic liquids are combined to form a reactive solution suitable for cleaning carpets; however, most combinations of various liquid components would be suitable. Additionally, although the above description discussed mainly having only two replicated inlet chemical units (i.e. hoses 11*a*, and 11*b*, inlet ports 16 and 18, inlet chambers 17, etc.), it is contemplated to have any number of replicated portions to accommodate any number of chemicals to be mixed or to flow through from a higher pressure to a lower pressure environment.

Furthermore, one skilled in the art would understand that varying shapes and sizes of the block and various chambers, plug sizes and diameters, type of supply and dispensing lines (hose, pipe, or otherwise), filter screen specifications, port shapes sizes and diameters and number of each are contemplated. For example, a multi-port mixing block integrating three or more supply lines is contemplated, each with respective components, such as respective ports, chamber plugs, filters, and blowback devices 26 integrated upstream to the mixing chamber. Additionally, it is also contemplated as an alternative embodiment to have several mixing chambers in parallel and/or in serial fashion. For example, five chemicals could be imported into the mixing block 10, the first two can be mixed together and flowed into a first mixing chamber. The second two mixed in a second mixing chamber. The fifth mixed into a third mixing chamber with the second and third mixed chemicals. Finally, all of the mixed chemicals would come together in a forth mixing chamber. Thus, it is contemplated to utilize most any type of combination of chemicals and mixing chambers, and various pressure gradients between various chambers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A fluid mixing block for mixing fluid components of a reactive solution, comprising:

a mixing block housing;

at least two inlet ports and respective at least two inlet chambers formed within the mixing block housing, wherein the inlet ports and inlet chambers each accept an injection of a fluid from a supply source;

a mixing chamber, formed within the mixing block housing, wherein fluids injected from the inlet chambers are combined and mix to form a solution of desired reactivity at a lower pressure than a pressure of each respective inlet chamber;

a dispensing port, formed within the mixing block housing, wherein the desired solution exits the mixing block housing;

at least three individual chamber plugs, which are removably fastened to the mixing block housing to allow for manual visual inspection, cleaning, and adjustments of the inlet and mixing chambers; and wherein a supply filter is mechanically fastened to each inlet chamber plug for filtering out suspended particles within a fluid flowing therethrough to prevent clogging of downstream chambers or other parts.

2. The fluid mixing block of claim 1, further comprising:

a flow control device attached to the mixing block housing between each inlet chamber and the mixing chamber to reduce the rate of flow of fluid flowing therethrough and to prevent fluid from flowing back upstream into a fluid supply source.

3. The fluid mixing block of claim 1, further comprising a backflow prevention device coupled to one of the two inlet ports.

4. The fluid mixing block of claim 1, wherein one of the two inlet ports further comprises oriented substantially parallel to the first inlet port, and disposed substantially noncollinear with the orientation of the first inlet port; and wherein the dispensing port comprises being substantially equidistant from the two inlet ports, and oriented substantially orthogonal to the two inlet ports.

5. The fluid mixing block of claim 1, further comprising a plurality of mixing block shafts through the housing comprising orientation and dimensions sufficient to receive mounting shafts, whereby the mixing block may be mounted to a surface.

6. The fluid mixing block of claim 1, further comprising a first flow control device including:

a backflow prevention device; and a flow rate reducing orifice.

7. A fluid mixing block for mixing fluid components of a reactive solution, comprising:

at least a first and second inlet port and an outlet port;

at least a first and second inlet chamber and a mixing chamber;

a first backflow device coupled between the first inlet chamber and the mixing chamber;

a second backflow device coupled between the second inlet chamber and the mixing chamber;

at least three individual chamber plugs, which are removably fastened to the mixing block to allow for manual visual inspection, cleaning, and adjustments of the first, second and mixing chambers;

a first fluid located in the first inlet chamber at a first pressure, and the first fluid located in the mixing chamber at a second pressure that is less than the first pressure;

a second fluid located in the second inlet chamber at one pressure, and the second fluid located in die mixing chamber at another pressure that is less than the one pressure; and wherein a supply filter is mechanically fastened to an inlet chamber plug for filtering out suspended particles within a fluid flowing therethrough to prevent clogging of downstream chambers or other parts.

8. The fluid mixing block of claim 7, wherein the first and second backflow device is configured to reduce a rate of flow of fluid flowing therethrough and to prevent fluid from flowing back upstream into a fluid supply source.

9. A fluid mixing block system for mixing fluids, comprising:

a mixing block housing;

at least two inlet ports and respective at least two inlet chambers formed within the mixing block housing, wherein the inlet ports and inlet chambers each accept an injection of a fluid from a supply source;

a mixing chamber, formed within the mixing block housing, wherein fluids injected from the inlet chambers are combined and mix to form a solution of desired reactivity at a lower pressure than a pressure of each respective inlet chamber;

a dispensing port, formed within the mixing block housing, wherein the desired solution exits the mixing block housing;

at least three individual chamber plugs, which are removably fastened to the mixing block housing to allow for manual visual inspection, cleaning, and adjustments of the inlet and mixing chambers; and wherein a supply filter is mechanically fastened to each inlet chamber plug for filtering out suspended particles within a fluid flowing therethrough to prevent clogging of downstream chambers or other parts.

10. The fluid mixing block system of claim 9, further comprising a backflow prevention device coupled to one of the two inlet ports.

11. The fluid mixing block system of claim 9, wherein one of the two inlet ports further comprises oriented substantially parallel to the first inlet port, and disposed substantially non-collinear with the orientation of the first inlet port; and wherein the dispensing port comprises being substantially equidistant from the two inlet ports, and oriented substantially orthogonal to the two inlet ports.

12. The fluid mixing block system of claim 9, further comprising a plurality of mixing block shafts through the housing comprising orientation and dimensions sufficient to receive mounting shafts, whereby the mixing block may be mounted to a surface.

13. The fluid mixing block system of claim 9, further comprising a first flow control device including:

a backflow prevention device; and a flow rate reducing orifice.

* * * * *